Feb. 17, 1959 — E. WALLACE — 2,873,525
SHEARS
Filed Dec. 30, 1957
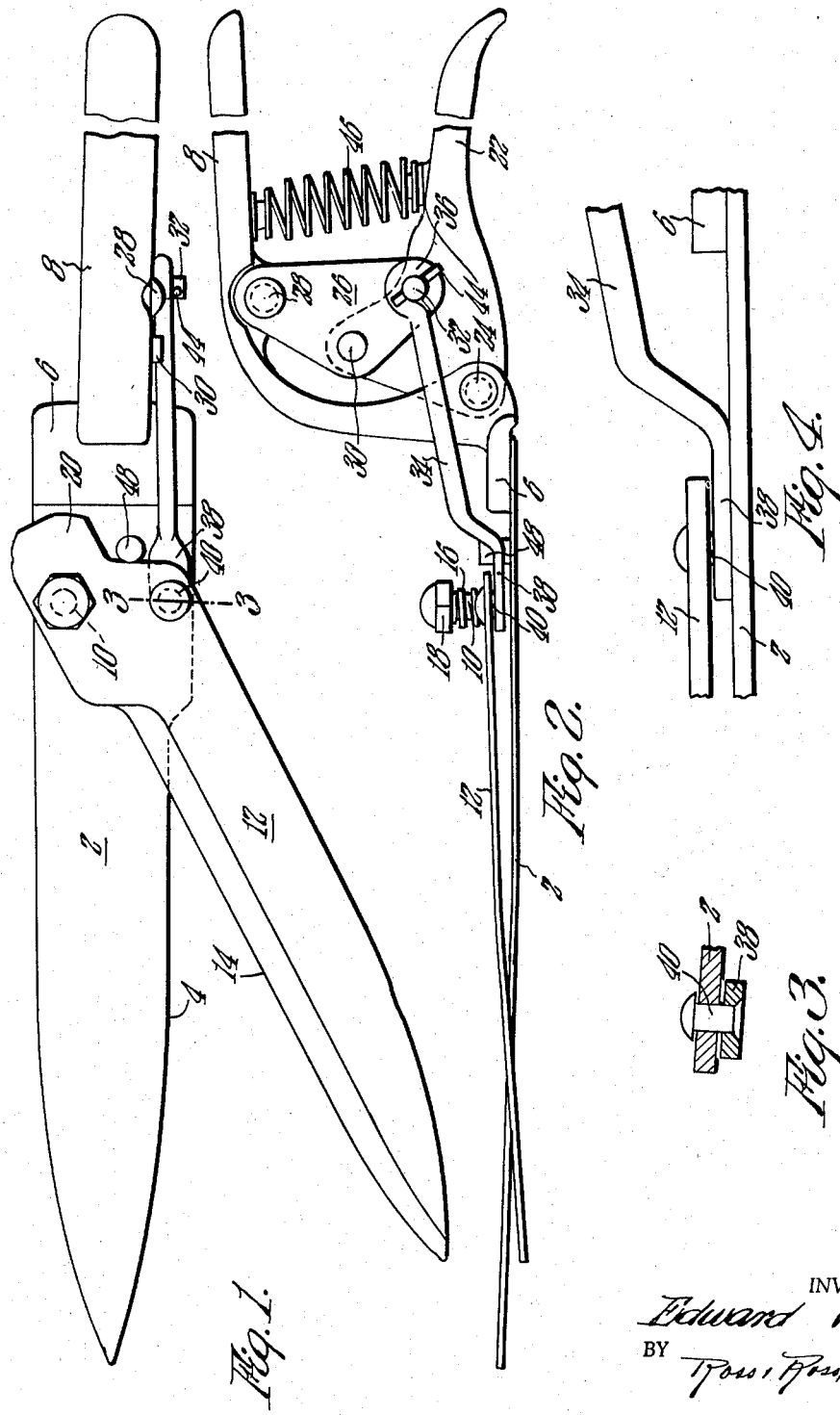
INVENTOR.
Edward Wallace.
BY Ross & Ross, Attys.

United States Patent Office

2,873,525
Patented Feb. 17, 1959

2,873,525

SHEARS

Edward Wallace, Longmeadow, Mass.

Application December 30, 1957, Serial No. 705,912

4 Claims. (Cl. 30—248)

The invention relates to improvements in a shear construction and is directed more particularly to a shear of the type commonly known as a hand operated grass shear.

The principal object of the invention is directed to the provision of means in a shear to provide a maximum cutting and shearing force between the cutting edges of the blades during the cutting operation thereof, and same is accomplished by a novel combination of parts forming a shear which is not only relatively simple in form, but also efficient in operation and economical in production as compared with present day shears.

It is well known that it is common practise to so swingably connect the blades of a shear that the longitudinal planes of the blades, in open position thereof, are relatively angular while the transverse planes of the blades are also relatively angular or relatively inclined. This arrangement is such that there is but a relatively short shearing and cutting contact between the cutting edges of the blades. It is desired and necessary to provide at least a predetermined minimum of transverse angular relation of the blades for an efficient shearing and cutting action in the cutting operation thereof.

Such transverse angular relationship of the blades may be called an initial or minimum inclination or cant. Same is necessary and is to be found in all shears of the general type to which the invention relates in order that they may function properly in the cutting operation.

According to the novel features of the shear of this invention, a pushing element is provided which is so formed and connected to the movable handle and movable blade that, as the shear handles are squeezed from open position, as shown, the pushing element pushes forwardly and angularly downwardly to swing the movable blade to closed position. At the same time, the transverse angularity or inclination of the movable blade relative to the stationary blade is established and limited to that predetermined minimum desired for the most effective shearing and cutting force of the blades on the object or material being cut.

In Patent No. 2,679,096, issued to me on May 25, 1954, there is shown a grass shear having a push rod for swinging and pushing a movable blade forwardly and downwardly. As distinguished therefrom and according to this invention, a pushing element is formed in a novel manner and is so connected to a movable blade that, as the element is operated with a pushing force, the effect thereof is such as to pull the rear edge of the movable blade downwardly toward the other blade. At the same time, when the blades meet a certain resistance therebetween, the pushing element limits the movable blade in its down position. Thereby, there is provided the desired minimum transverse angularity or inclination of the movable blade relative to the stationary blade so as to obtain the maximum cutting and shearing force of the blades on the material to be cut.

As a distinguishing feature of the present invention, the pushing element of the shear is so formed and connected to the movable blade, that it exerts a relatively greater downward pulling force than the former downward pushing force of the push rod of the patent referred to, while limiting the down position of the back edge of the movable blade to thereby obtain the desired minimum transverse angularity of the movable blade so that the cutting and shearing force of the blades is greatly increased.

Various changes and modifications may be made in the form of the shear of the invention without departing from the spirit and scope thereof.

In the drawings:

Fig. 1 is a plan view of a shear embodying the novel features of the invention;

Fig. 2 is a side elevational view of the shear shown in Fig. 1;

Fig. 3 is an enlarged sectional view on the line 3—3 of Fig. 1; and

Fig. 4 is an enlarged side elevational view of the connection of the pushing element and movable blade of the shear with sufficient resistance between the blades to cause the end of the pushing member to abut the stationary blade.

Referring now to the drawings more in detail, the novel features of the invention will be fully described.

A stationary blade 2 having an inner cutting edge 4 has its rear end secured to the lower portion 6 of an upper stationary handle 8 by rivets or the like, not shown, to provide an integral structure.

A pivot 10 is secured to the stationary blade 2 adjacent the rear end portion thereof. A movable blade 12 is mounted for swinging on said pivot between the open position, shown in Fig. 1, and a closed position. Said blade 12 has an inner cutting edge 14 for cooperating with the cutting edge 4 of the blade 2.

A compression spring 16 surrounds the pivot 10, and a nut 18 is in threaded engagement with the upper end of the said pivot. A heel portion 20 at the rear end of the blade 12 is in sliding contact with the rear end portion of blade 2 and, in cooperation with the spring 16, slightly inclines the blade 12 transversely relative to the blade 2 so as to provide the initial inclination well known in connection with shears.

The blades are bowed longitudinally, as in common practise. The connection and arrangement of the blades are such that the blades, in open position thereof, are disposed relatively angularly, as shown in Fig. 2, so as to function with the desired shearing and cutting action in the cutting operation thereof.

The referred to transverse inclination of the blade 12 has long been common practise in shears, and may be termed the initial inclination. It is desired to maintain a predetermined minimum inclination for the proper cutting operation of the shear.

A movable handle 22 is pivoted at 24 to the upper handle 8. As the handles 8 and 22 are squeezed for closing the movable blade 12, said handle 22 swings counterclockwise.

A triangular shaped lever 26, at its upper end, is pivoted at 28 to the upper stationary handle 8. Said lever 26, intermediate its upper and lower ends, is pivoted at 30 to an upper portion of the movable handle 22, as shown. There is sufficient looseness in the pivotal connection 30 so that as the handles are squeezed as aforesaid, the movable handle swings counterclockwise, the lever 26 swings clockwise, and the pivotal connection 30 of the lever 26 and handle 22 is moved forwardly to the left with reference to the drawing.

A stud 32 projects outwardly from the lower end of lever 26. As the handles are squeezed so that handle 22 swings counterclockwise and lever 26 swings clockwise as aforesaid, the stud 32 swings forwardly, or to the left with reference to the drawing.

An elongated pushing element 34 has a rear end 36 journalled on the stud 32. The forward end 38 thereof is shown as offset relative to a plane extending through the longitudinal axis of the member 34, and is disposed beneath the rear portion of the movable blade.

As in Fig. 2, the member 34 inclines from its rear end downwardly and forwardly from a horizontal plane extending through the axis of stud 32 and in substantial parallelism with the plane of blade 2.

If desired, the rear end 36 of the element 34 may be pivoted at 30 instead of at 32, as shown.

A pintle or rivet 40 has a lower end secured in the forward end 38 of the pushing element 34, which extends rotably upwardly through the upper blade 12. The pintle is headed over, as shown.

The pintle 40 and blade 12 operate as an ordinary pivotal connection so that there may be relative angular or swinging movements of the blade 12, and the end of the pushing element 34.

A stop 48 is fixed to the stationary blade 2 for engagement by inner end portions of the blade 12 so as to limit said blade in its open as well as in its closed position.

In operation of the shear, particularly with an object to be cut between the blades, the handles are squeezed so that the pushing element functions with a forward and downward force. Such swings the blade 12 in closing direction, and at the same time the downward force is converted to a downward pull on the back edge of the blade 12, and is accounted for by the novel pushing element and its connection with the movable blade.

The forward end 38 of the pushing element 34 being disposed between the blades, said end in operation of the shear pulls the blade 12 downwardly while said blade swings relative to the upper side of the stationary blade.

The forward end of the pushing element being below the rear edge of the movable blade, it is between the pair of blades. When the shear blades are closed with an object between the cutting edges thereof, there can be such resistance to the closing of the blades that the forward end 38 of the pushing element bears on the stationary blade, as in Fig. 4. Thus the end 38 not only limits downward movement of the rear edge of the movable blade but also establishes the desired transverse minimum inclination of said movable blade.

With the forward end 38 of the pushing element 34 disposed somewhat below a plane through the longitudinal axis of the element, there is a greater downward pulling force on the blade 12 than would be the case were the pushing element straight from end to end. The element 34 does not tend to elevate the blade 12 but pulls it directly downwardly to act as a stop, and thereby provides no more or less space between the rear edges of the blades than is desired to establish the desired minimum inclination of said blade 12.

Various changes and modifications may be made in the practise of the invention without departing from the spirit and scope thereof, and it is desired to be limited, if at all, by the appended claims rather than by the foregoing description.

I claim:

1. Shear construction comprising in combination, a stationary blade and a handle integral therewith, a movable blade, a pivotal connection between the rear ends of said blades for the swinging of said movable blade between open and closed positions relative to said stationary blade, a movable handle pivoted to the first-named handle for swinging towards and away therefrom, an elongated pushing element having a rear end pivotally connected to said movable handle and a forward end portion disposed beneath a rear end portion of said movable blade and being pivotally connected thereto whereby as said pushing element is pushed forwardly by movement of said movable handle towards the first-named handle the forward end portion of said pushing element pulls said movable blade downwardly and simultaneously swings said movable blade to closed position.

2. Shear connection as set forth in claim 1 wherein, the pivotal connection of the rear end portion of the pushing element and movable handle is related to the pivoted connection of the forward end portion of said pushing element and movable blade in such a way that said pushing element declines forwardly from the rear end thereof.

3. Shear construction comprising in combination, a stationary blade and a handle integral therewith, a movable blade and a pivotal connection between rear end portions of said blades for the swinging of said movable blade between open and closed positions relative to said stationary blade, a movable handle pivoted to the first-named handle for swinging towards and away therefrom, an elongated pushing element having a rear end and pivotal connections between said rear end and said movable handle, the forward end of said pushing element disposed between rear end portions of said blades and being pivotally connected to said movable blade adjacent the rear edge thereof, all adapted and arranged whereby said pushing element in operation of the shear swings said movable blade to closed position and simultaneously therewith pulls said movable blade downwardly so that the forward end of said pushing element abuts said stationary blade to provide a desired minimum of inclination to said movable blade.

4. Shear construction as set forth in claim 3 wherein, a horizontal plane extending through the axis of the connection between the rear end of said pushing element and movable handle is disposed above the horizontal plane of said blades whereby in cutting operation of the shear a pushing force of said pushing element swings said movable blade and simultaneously pulls the rear edge of said movable blade downwardly so that the forward end of said pushing element abuts said stationary blade and limits downward movement of said movable blade to establish a predetermined inclination of said movable blade relative to said stationary blade.

No references cited.